United States Patent
Riguer (10) Patent No.: US 11,450,058 B2
(45) Date of Patent: Sep. 20, 2022

(54) EARLY TERMINATION OF BOUNDING VOLUME HIERARCHY TRAVERSAL

(71) Applicant: ATI Technologies ULC, Markham (CA)

(72) Inventor: Guennadi Riguer, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/028,815

(22) Filed: Sep. 22, 2020

(65) Prior Publication Data

US 2021/0407176 A1 Dec. 30, 2021

Related U.S. Application Data (60) Provisional application No. 63/044,710, filed on Jun. 26, 2020.

(51) Int. Cl.
| | |
|---|---|
| G06T 15/06 | (2011.01) |
| G06T 15/08 | (2011.01) |
| G06T 17/20 | (2006.01) |
| G06T 17/10 | (2006.01) |
| G06T 15/00 | (2011.01) |

(52) U.S. Cl.
CPC .......... *G06T 15/06* (2013.01); *G06T 15/005* (2013.01); *G06T 15/08* (2013.01); *G06T 17/10* (2013.01); *G06T 17/20* (2013.01)

(58) Field of Classification Search
CPC combination set(s) only.
See application file for complete search history.

(56) References Cited

U.S. PATENT DOCUMENTS

| | | | |
|---|---|---|---|
| 2005/0146522 A1* | 7/2005 | Maillot | G06T 17/20 345/423 |
| 2014/0306959 A1* | 10/2014 | Ozdas | G06T 15/06 345/424 |
| 2016/0093090 A1* | 3/2016 | Shin | G06T 17/005 345/419 |
| 2019/0019325 A1* | 1/2019 | Clark | G06F 30/327 |
| 2019/0156550 A1* | 5/2019 | Stanard | G06T 15/50 |
| 2021/0027520 A1* | 1/2021 | Story | G06T 15/06 |

* cited by examiner

*Primary Examiner* — Andrew G Yang
(74) *Attorney, Agent, or Firm* — Volpe Koenig (57) ABSTRACT

Techniques for performing ray tracing operations are provided. The techniques include receiving a request to determine whether a ray intersects any primitive of a set of primitives, evaluating the ray against non-leaf nodes of a bounding volume hierarchy to determine whether to eliminate portions of the bounding volume hierarchy from consideration, evaluating the ray against at least one early-termination node not eliminated from consideration, and determining whether to terminate traversal of the bounding volume hierarchy early and to identify that the ray hits a primitive, based on the result of the evaluation of the ray against the at least one early-termination node.

20 Claims, 7 Drawing Sheets

FIG. 7

EARLY TERMINATION OF BOUNDING VOLUME HIERARCHY TRAVERSAL

CROSS-REFERENCE TO RELATED APPLICATIONS

This application claims the benefit of U.S. Provisional application No. 63/044,710, entitled "EARLY TERMINATION OF BOUNDING VOLUME HIERARCHY TRAVERSAL," filed on Jun. 26, 2020, the entirety of which is hereby incorporated herein by reference.

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for performing ray tracing operations are provided. The techniques include receiving a request to determine whether a ray intersects any primitive of a set of primitives, evaluating the ray against non-leaf nodes of a bounding volume hierarchy to determine whether to eliminate portions of the bounding volume hierarchy from consideration, evaluating the ray against at least one early-termination node not eliminated from consideration, and determining whether to terminate traversal of the bounding volume hierarchy early and to identify that the ray hits a primitive, based on the result of the evaluation of the ray against the at least one early-termination node.

Figure 1:
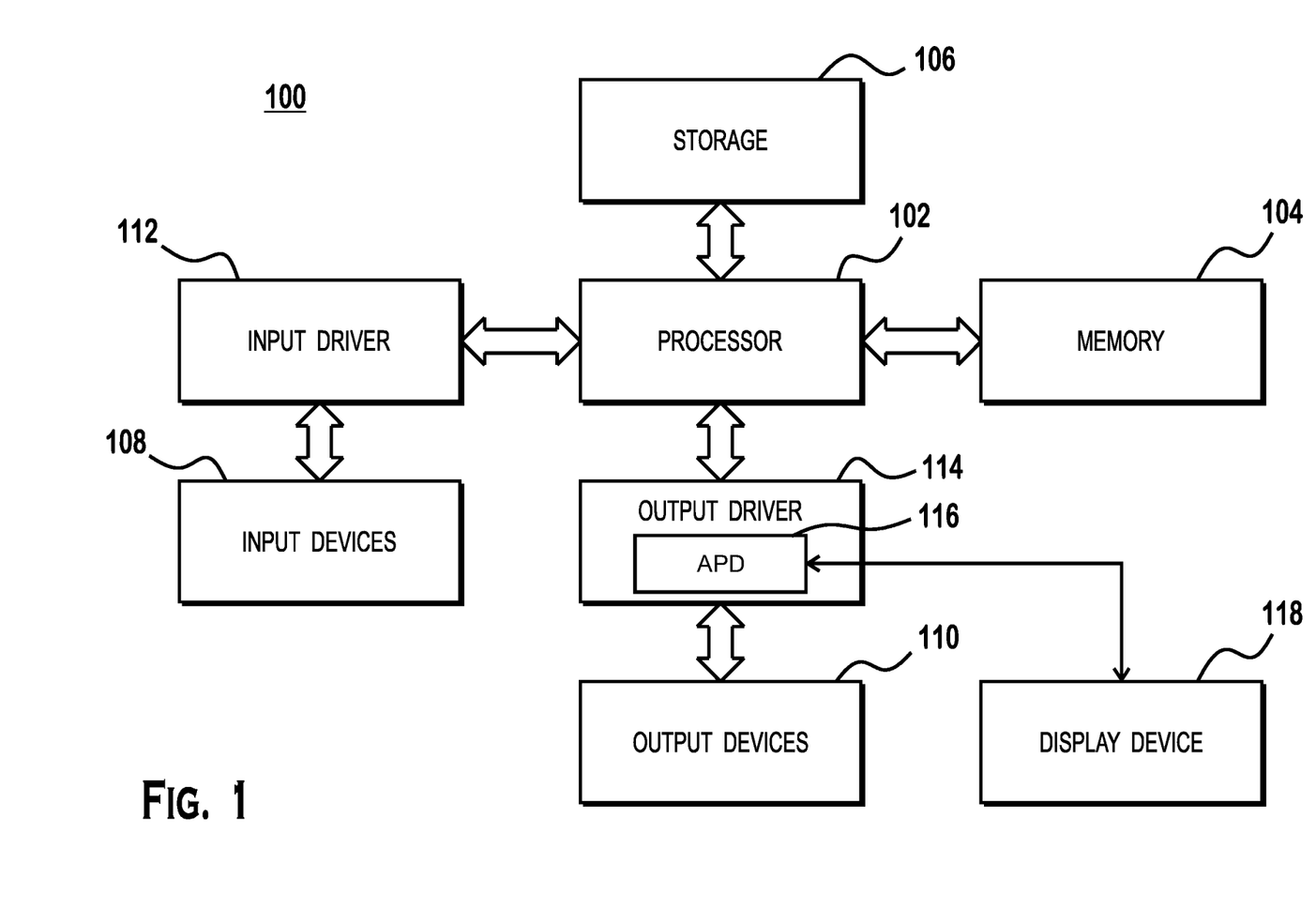
FIG. 1 is a block diagram of an example device in which one or more features of the disclosure are implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein, in different implementations, each processor core is a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated for any processing system that performs processing tasks in accordance with a SIMD paradigm to be configured to perform the functionality described herein. Alternatively, it is contemplated that computing systems that do not perform processing tasks in accordance with a SIMD paradigm performs the functionality described herein.

Figure 2:
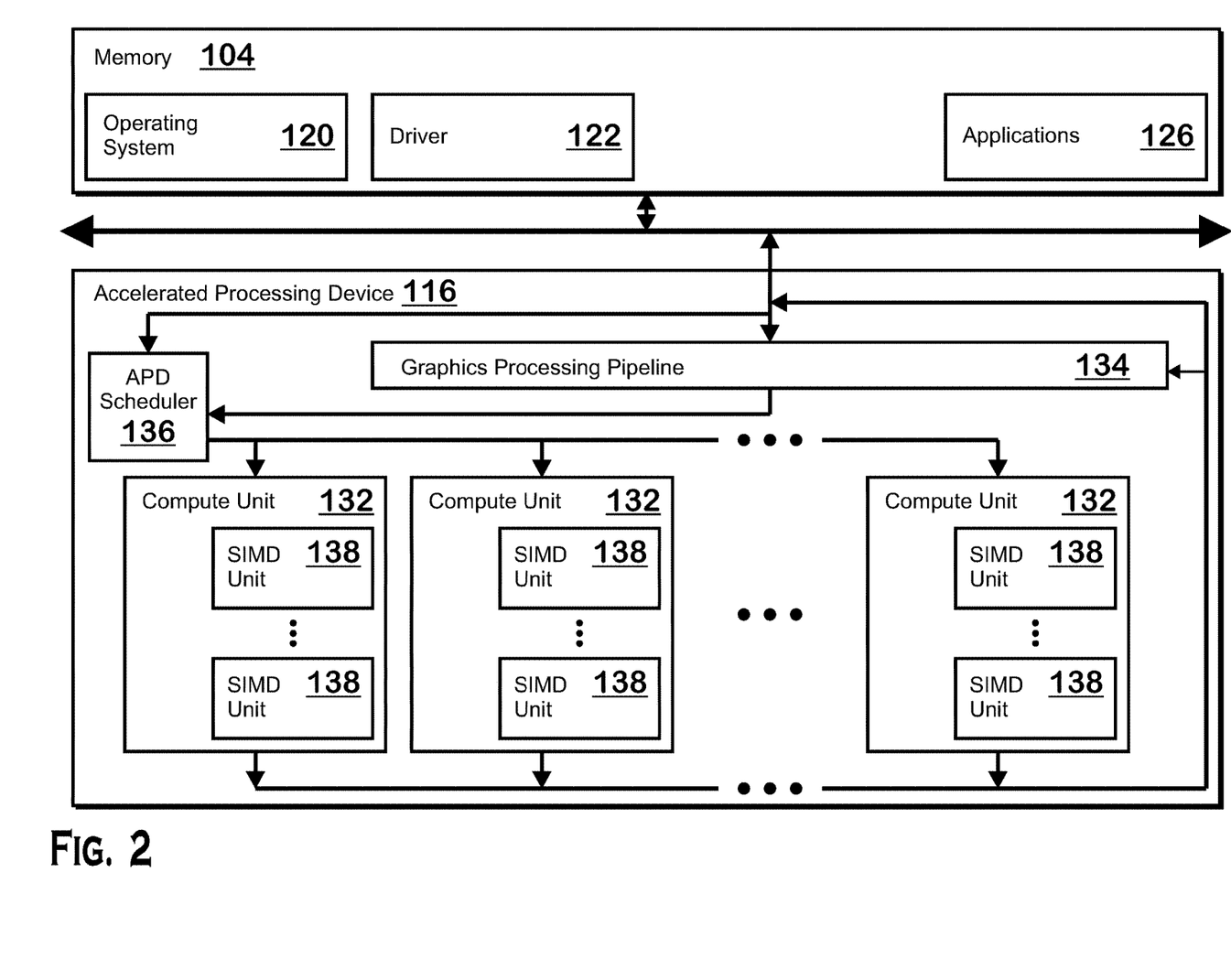
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and also, in some situations, executes other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are suited for parallel processing. In various examples, the APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but is able to execute that instruction with different data. In some situations, lanes are switched off with predication if not all lanes need to execute a given instruction. In some situations, predication is also used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. In various examples, work-items are executed simultaneously (or partially simultaneously and partially sequentially) as a "wavefront" on a single SIMD processing unit 138. One or more wavefronts are included in a "work group," which includes a collection of work-items designated to execute the same program. In some implementations, a work group is executed by executing each of the wavefronts that make up the work group. In alternatives, the wavefronts are executed on a single SIMD unit 138 or on different SIMD units 138. In some implementations, wavefronts are the largest collection of work-items that are executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116, including the compute units 132, implements ray tracing, which is a technique that renders a 3D scene by testing for intersection between simulated light rays and objects in a scene. In some implementations, much of the work involved in ray tracing is performed by programmable shader programs, executed on the SIMD units 138 in the compute units 132, as described in additional detail below.

Figure 3:
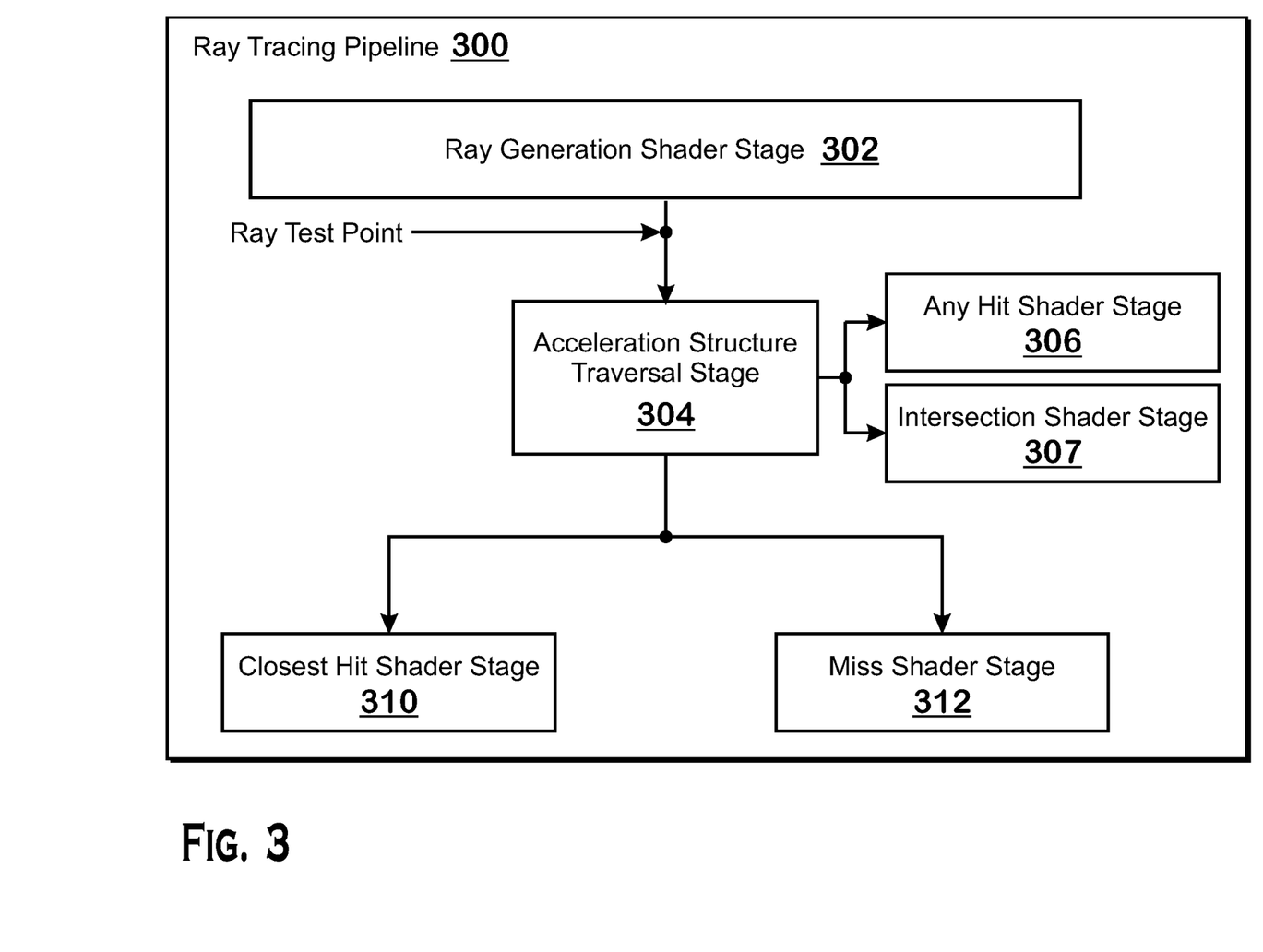
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 is, in various implementations, orchestrated partially or fully in software or partially or fully in hardware, and, in various implementations, is orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing. Although described as executing on the SIMD unit 138 of FIG. 3, it should be understood that in other implementations, other hardware (such as one or more processors), having or not having SIMD capabilities (e.g., the processor 102), alternatively executes the shader programs of the illustrated ray tracing pipeline 300.

In some modes of operation, the ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 "rejects" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency sometimes determines that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that, in various implementations, the shader programs defined for the closest hit shader 310 and miss shader 312 implements a wide variety of techniques for coloring ray and/or performing other operations. The term "hit shader" is sometimes used herein, and refers to one or more of an any hit shader 306, an intersection shader 307, and a closest hit shader 310.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. It is possible for multiple rays to be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 are used to render a scene have been described, any of a wide variety of techniques are alternatively used.

As described above, the determination of whether a ray intersects an object is referred to herein as a "ray intersection test." The ray intersection test involves shooting a ray from an origin and determining whether the ray intersects a geometric primitive (e.g., a triangle) and, if so, what distance from the origin the triangle intersection is at. For efficiency, the ray tracing test uses a representation of space referred to as an acceleration structure, such as a bounding volume hierarchy. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each typically represent mutually exclusive axis aligned bounding boxes that subdivide the entire region. Each of those two children has two child nodes that represent axis aligned bounding boxes that subdivide the space of their parents, and so on. Leaf nodes represent a triangle or other geometric primitive against which a ray intersection test is performed. A non-leaf node is sometimes referred to as a "box node" herein and a leaf node is sometimes referred to as a "triangle node" herein.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box are eliminated from the test. Thus, a ray intersection test is performed as a sequence of tests of the ray against axis-aligned bounding boxes, followed by tests against triangles.

Figure 4:
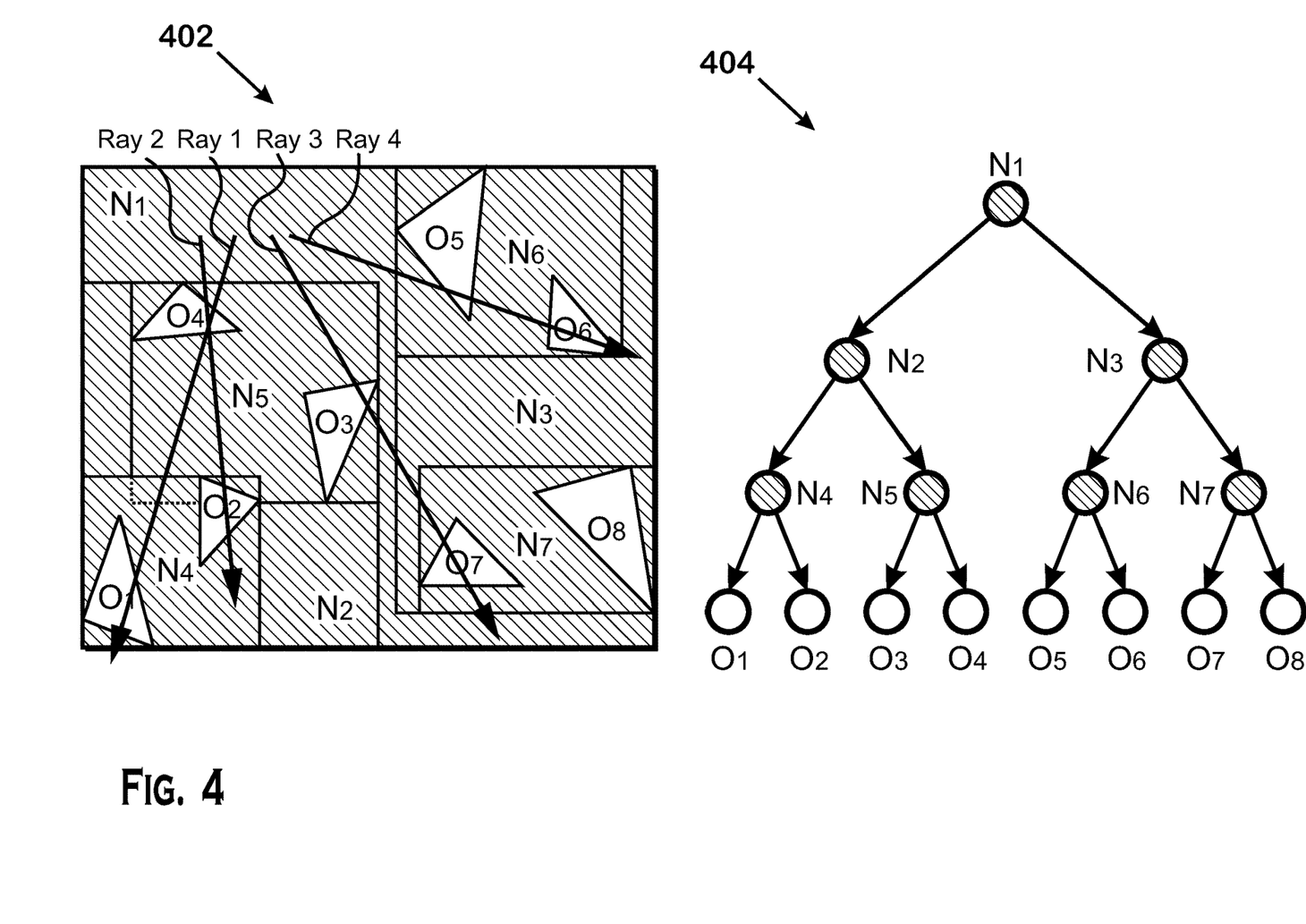
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 shoots rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader nor an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

As described elsewhere herein, a bounding volume hierarchy speeds up the process of testing a ray against triangles by allowing all triangles within certain regions of space to be eliminated from consideration. Additional speed can be gained for certain types of ray intersection tests through the use of an early-termination feature based on convex mesh-interior geometry.

The early-termination feature facilitates speed-up of certain kinds of ray intersection tests. Specifically, in some instances, the APD 116 receives a request to shoot a ray and determine whether the ray intersects any geometry (such as any triangle or any mesh, where a mesh is a collection of triangles or other geometric primitives), or to determine whether the ray intersects any geometry of one or more specified types (for example, whether the ray intersects an opaque primitive that is not a light source). In some examples, software (such as a shader program) utilizes such a request to determine whether a primitive is in shadow. In one example, a shader program determines a lighting intensity for a particular pixel on a triangle using a ray tracing technique. In an example, the ray tracing technique involves shooting rays from the point on the triangle corresponding to the pixel and determining how many of those rays intersect an object that is considered to shade the pixel. The shader program sets the lighting intensity based on the percentage of rays that intersect such an object as compared with the percentage of rays that do not shade the object and that contribute to lighting.

The early-termination feature assists with the ray-intersection tests similar to the above by allowing for a final result that does not require precise information about the intersection location to be obtained faster than a full traversal through the bounding volume hierarchy. More specifically, the early-termination feature functions in conjunction with special early-termination nodes of a bounding volume hierarchy. The early termination nodes are associated with convex mesh-interior primitives that are fully enclosed by an airtight mesh. Because such primitives are convex and are fully enclosed by an airtight mesh, any ray that passes through such a primitive is guaranteed to pass through the airtight mesh. Thus any ray that passes through such a primitive is guaranteed to execute a triangle of that mesh. Additional details regarding this early-termination feature are provided below.

Figure 5:
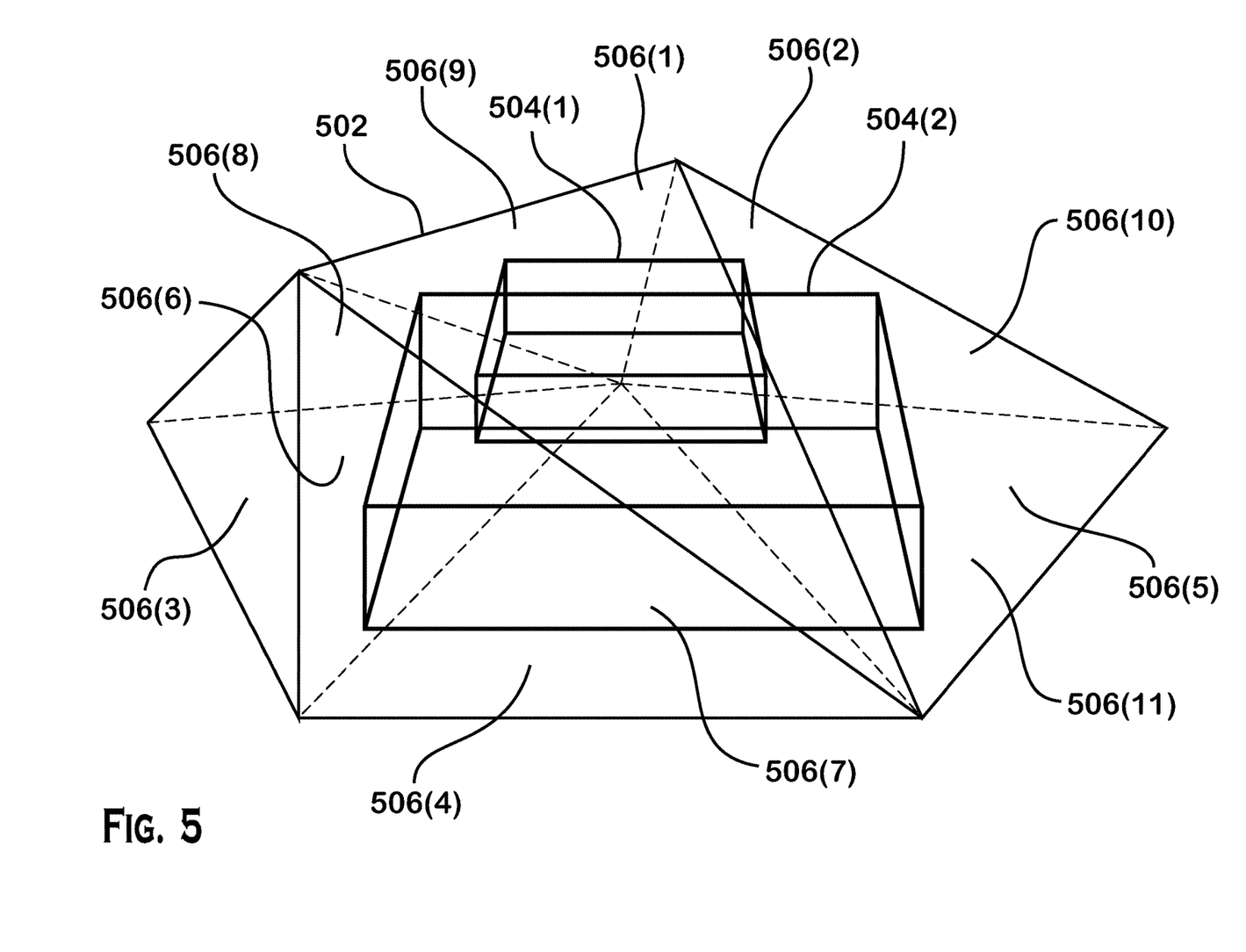
FIG. 5 illustrates a fully-enclosed mesh with convex mesh-interior geometry primitives, according to an example.

FIG. 5 illustrates an example mesh 502 and convex mesh-interior geometry 504. The mesh 502 is a fully-enclosed triangle mesh that includes multiple triangles 506. The mesh 502 is fully-enclosed in that there are no spaces between the triangles 506 of the mesh 502. Although described with respect to a fully-enclosed mesh, the techniques described herein could be applied to a mesh that is not fully-enclosed.

Within the fully-enclosed mesh 502 are convex mesh-interior geometry primitives 504. In the example of FIG. 5, two convex mesh-interior geometry primitives 504 are illustrated within the mesh 502. The convex mesh-interior geometry primitives 504 are geometrically convex. In addition, the convex mesh-interior geometry primitives 504 are completely within the volume enclosed by the mesh. Thus, any ray that intersects a convex mesh-interior geometry primitive 504 intersects at least one triangle of the mesh 502.

In some implementations, all primitives of the airtight mesh 502 are of the same type. In such implementations, a determination that a ray intersects a convex mesh-interior geometry primitive 504 that is interior to such a mesh 502 results in a determination that the ray intersects a primitive of that type. In an example, all primitives of the airtight mesh 502 are considered to be primitives that block a light source. Thus a determination that a ray intersects a convex mesh-interior geometry primitive 504 associated with that mesh 502 is a determination that the ray intersects a primitive that blocks a light source.

Figure 6:
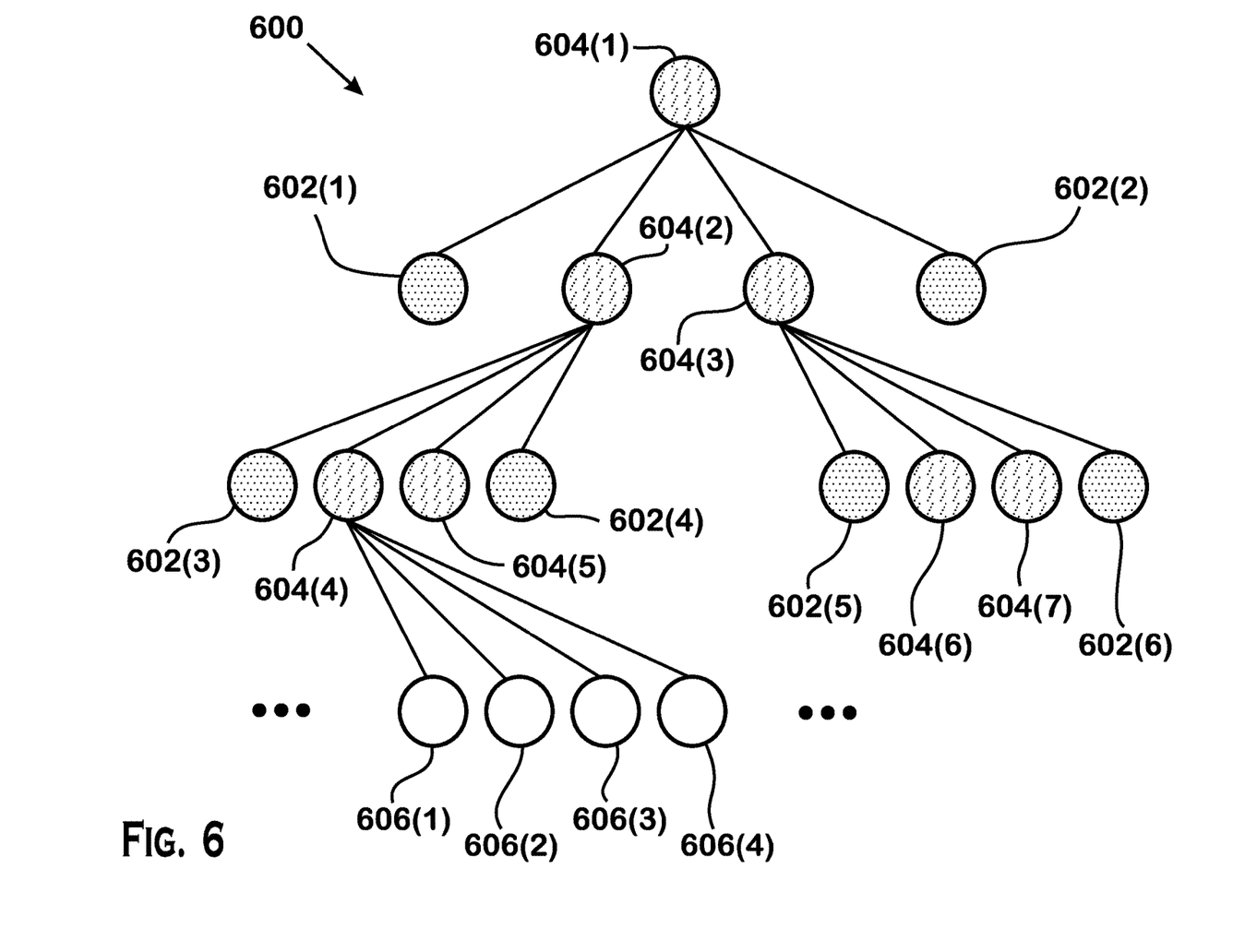
FIG. 6 illustrates a bounding volume hierarchy include early termination nodes, according to an example.

FIG. 6 is an illustration of a bounding volume hierarchy 600 that includes early termination nodes 602, according to an example. Note that although a specific number of non-leaf nodes 604 and early termination nodes 602 are illustrated as children to non-leaf nodes 604, the present disclosure contemplates that any number of non-leaf nodes 604 and early termination nodes 602 can be children of non-leaf nodes 604. The bounding volume hierarchy includes non-leaf nodes 604, leaf nodes 606, and early termination nodes 602. The non-leaf nodes 604 are similar to (in some implementations, the same as) the non-leaf nodes ("N" nodes) of FIG. 4. The leaf nodes 606 are similar to (in some implementations, the same as) the leaf nodes ("O" nodes) of FIG. 4. The early termination nodes 602 correspond to the convex mesh-interior geometry primitives 504 of FIG. 5. Early termination nodes 602 are children of certain non-leaf nodes 604. Each early termination node 602 is associated with a convex mesh-interior geometry primitive 504 that is fully within the bounding box associated with the parent of that early termination node 602. This relationship allows a failed test against the bounding box of the non-leaf nodes to eliminate early termination nodes 602 that are within that bounding box.

In various examples, any technically feasible technique is used to generate the bounding volume hierarchy 600. In some implementations, the technique accepts one or more fully-enclosed meshes 502 as input (in addition to the other geometry from which the leaf nodes 606 and non-leaf nodes 604 are generated) and generates one or more mesh-interior geometry primitives 504 that are fully interior to those the fully-enclosed meshes 502. The technique also generates a bounding volume hierarchy 600 in which each early termination node 602 corresponds to a mesh-interior geometry primitive 502 and each early termination node 602 is the child of a non-leaf node 604 whose corresponding bounding box fully encloses the mesh-interior geometry primitive 502 of the early termination node 602.

In operation, the ray tracing pipeline 300 receives a request to determine whether a ray intersects any primitive (such as any triangle) or any primitive of a specified type (such as a primitive that blocks a light source). In some implementations, such a request is a request to determine whether a ray intersects any primitive of a type that is the same as the type of all triangles of a fully-enclosed triangle mesh 502 that includes at least one convex mesh-interior geometry primitive 504. In some examples, this "same type" is a fully opaque type of triangle. In other words, in some implementations, the request received is a request to determine whether a ray intersects any fully opaque triangle.

In response to the request, the ray tracing pipeline 300 traverses the bounding volume hierarchy 600 to determine whether the ray intersects any primitive. In response to encountering a non-leaf node 604, the ray tracing pipeline 300 evaluates the ray against the bounding box associated with that non-leaf node 604. If the ray is deemed to intersect that bounding box, then the ray tracing pipeline 300 does not eliminate the children of that non-leaf node 604 from consideration. If the ray is deemed to not intersect that bounding box, then the ray tracing pipeline 300 eliminates all children of that non-leaf node 604 from consideration.

In response to encountering a leaf node 606, the ray tracing pipeline 300 evaluates the ray against the primitive associated with that leaf node 606. If that evaluation determines that the ray intersects the primitive, then the traversal of the bounding volume hierarchy 600 ends and the ray tracing pipeline 300 determines that the ray intersects a primitive. If that evaluation determines that the ray does not intersect the primitive, then the traversal of the bounding volume hierarchy 600 does not end and the ray tracing pipeline 300 does not determine that the ray intersects a primitive.

In response to encountering an early termination node 602, the ray tracing pipeline 300 evaluates the ray against the convex mesh-interior geometry primitive 504 associated with that early termination node 602. If that evaluation determines that the ray intersects the convex mesh-interior geometry primitive 504, then the ray tracing pipeline 300 determines that the ray intersects any primitive and terminates traversal through the bounding volume hierarchy 600. If the evaluation determines that the ray does not intersect the convex mesh-interior geometry primitive 504, then the ray tracing pipeline 300 does not determine that the ray intersects any primitive and does not terminate traversal through the bounding volume hierarchy 600.

With the operations described above, it is possible for a ray intersection test that tests whether a ray intersects any primitive of a certain type (e.g., fully opaque) to be completed earlier than a technique that does not use the early termination nodes 602. More specifically, as can be seen, for example, in FIG. 6, a determination that a ray intersects an early termination node 602 allows the test of whether the ray intersects any primitive ray intersection test to be completed earlier than if the test required traversal all the way to the triangle nodes 606.

The convex mesh-interior geometry primitives 504 are any technically feasible geometry primitives. In some examples, the convex mesh-interior geometry primitives 504 are axis-aligned bounding boxes (i.e., three-dimensional boxes having all sides aligned with the axes of the coordinate system, that is, all sides parallel to planes $x=0$ $y=0$, or $z=0$), which allows the test for intersection with the convex mesh-interior geometry primitives 504 to be the same as the test for intersection with the bounding boxes associated with the non-leaf nodes 604. In other examples, the convex mesh-interior geometry primitives 504 are other geometry primitives, one example of which is a sphere.

In various alternatives, traversal through the bounding volume hierarchy 600 is performed in any technically feasible order. In some examples, traversal is performed in a depth-first manner, with the ray tracing pipeline 300 searching to the deepest level (e.g., to the leaf nodes 606), traversing back up if no intersection is found, and repeating this sequence as needed. In other examples, traversal is performed in a width-first manner, with the ray tracing pipeline 300 searching through all nodes of a level before proceeding to the next level. In other examples, traversal is performed in a different manner than depth-first or width-first.

Within a bounding volume hierarchy 600 that uses the disclosed early-termination technique, at least one non-leaf node 604 has at least one child that is an early termination node 602 and at least one child that is another non-leaf node 604.

Figure 7:
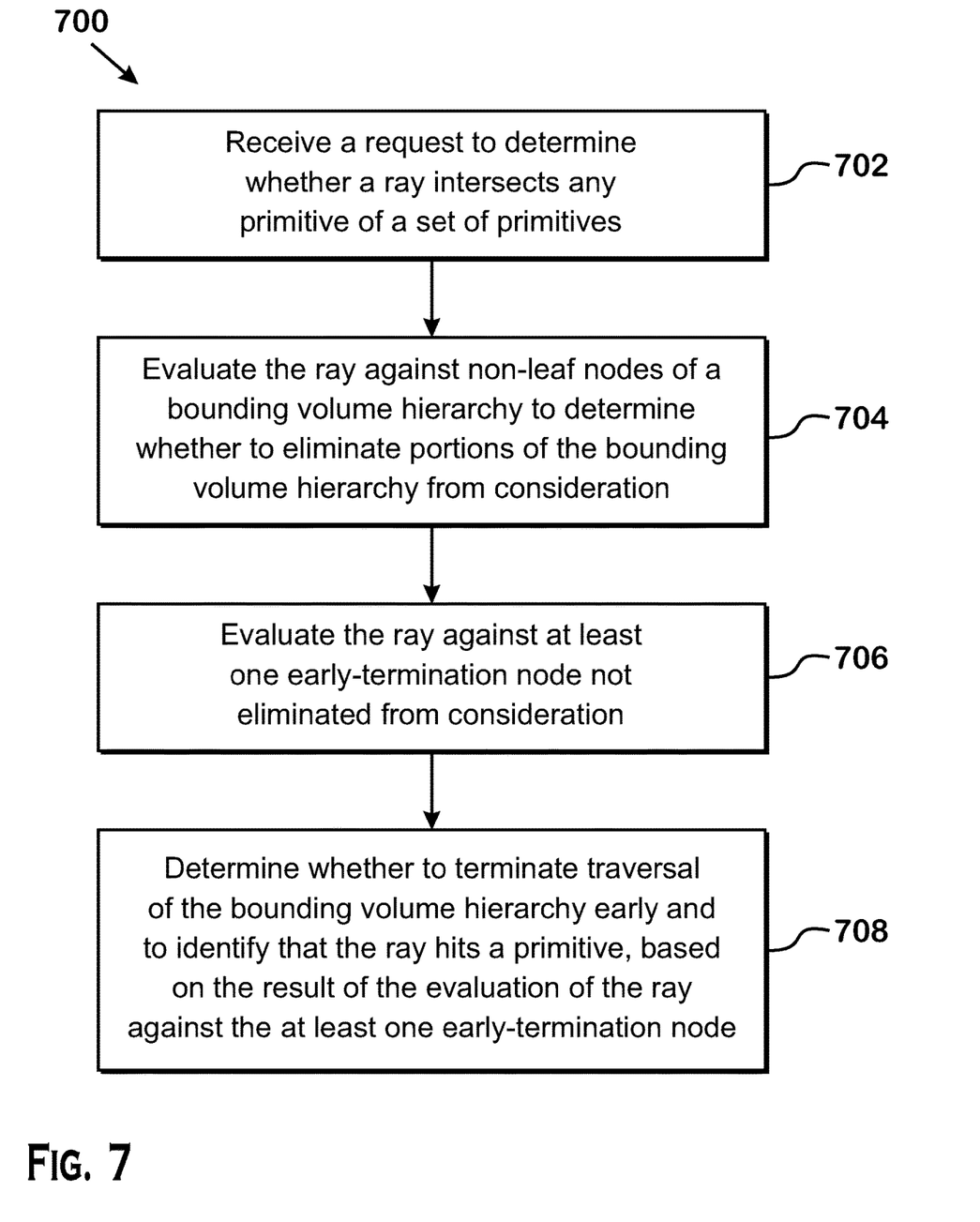
FIG. 7 is a flow diagram of a method for performing ray tracing operations, according to an example.

FIG. 7 is a flow diagram of a method 700 for performing ray-tracing operations, according to an example. Although described with respect to the system of FIGS. 1-6, those of skill in the art will understand that any system that performs the steps of the method 700 in any technically feasible order falls within the scope of the present disclosure.

The method 700 begins at step 702, where the ray tracing pipeline 300 receives a request to determine whether a ray intersects any primitive of a set of primitives. In some implementations, the set of primitives includes all primitives in a scene. In some implementations, the set of primitives includes all primitives of a fully-enclosed mesh 502 or all primitives of all fully-enclosed meshes 502 within a scene, where a scene includes geometry to be rendered to generate a frame. In some implementations, the set of primitives includes all primitives of a fully-enclosed mesh 502 for which at least one convex mesh-interior geometry primitive 504 has been generated. In some implementations, the set of primitives includes all primitives of a certain type. In some implementations, the set of primitives includes all primitives that block a light source and are not a light source. In some implementations, the primitives are triangles.

At step 704, the ray tracing pipeline 300 evaluates the ray against non-leaf nodes 604 of a bounding volume hierarchy 600 to determine whether to eliminate portions of the bounding volume hierarchy from consideration. More specifically, as described elsewhere herein, the non-leaf nodes 604 are associated with bounding boxes, such as axis-aligned bounding boxes. The bounding boxes enclose portions of a scene. Testing the ray against such bounding boxes thus allows geometry within that bounding box to be eliminated from consideration if the ray does not intersect the bounding box. Rays that do intersect a bounding box does not result in elimination of the geometry within the bounding box. Because the bounding box of a non-leaf node 604 encloses all geometry associated with the children of that non-leaf node 604, if a test against a bounding box determines that the ray does not intersect the bounding box, then the ray tracing pipeline 300 eliminates all children of that non-leaf node 604 from consideration.

At step 706, the ray tracing pipeline 300 encounters an early-termination node 602 that is not eliminated from consideration at step 704. The ray tracing pipeline 300 tests the ray for intersection against the geometry associated with the early-termination node 602. In some implementations, the geometry associated with an early-termination node 602 is an axis-aligned bounding box, and thus the same type of ray-intersection test is used for the non-leaf nodes 604 as for the early-termination nodes 602.

At step 708, the ray tracing pipeline 300 determines whether to terminate traversal of the bounding volume hierarchy 600 early and to identify that the ray hits a primitive of the set of primitives, based on the result of the evaluation of the ray against the at least one early-termination node 602. In some situations, the ray tracing pipeline 300 determines that the ray intersects an early-termination node 602. The ray tracing pipeline 300 thus terminates traversal of the bounding volume hierarchy 600 early and determines that the ray intersects an early-termination node 602. In some situations, the ray tracing pipeline 300 determines that the ray does not intersect an early-termination node 602. The ray tracing pipeline 300 thus does not terminate traversal of the bounding volume hierarchy 600 early and does not determine that the ray intersects an early-termination node 602. In this situation, if there are more nodes of the bounding volume hierarchy 600 to consider (i.e., there is at least one node of the bounding volume hierarchy 600 that has not been tested against the ray and that has not been eliminated from consideration), the ray tracing pipeline 300 proceeds to test the ray against these nodes. In such situations, in some examples, the ray tracing pipeline 300 again performs steps 704-708.

Note that it is possible for the ray tracing pipeline 300 to determine that the ray does not intersect with any early-termination node 602, but that the ray does intersect with a leaf node 606. In this situation, the ray tracing pipeline 300 determines that the ray intersects the geometry (e.g., triangle) associated with that leaf node 606.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:

receiving a request to determine whether a ray intersects any primitive of a set of primitives;

evaluating the ray against non-leaf nodes of a bounding volume hierarchy to determine whether to eliminate portions of the bounding volume hierarchy from consideration;

determining that the ray intersects at least one early-termination node not eliminated from consideration, wherein the early-termination node has an associated geometry that is fully enclosed by a mesh, wherein the mesh includes a plurality of primitives represented in leaf nodes of the bounding volume hierarchy, wherein the ray intersects the geometry that is fully enclosed by the mesh; and determining that traversal of the bounding volume hierarchy should terminate, based on the result of the evaluation of the ray against the at least one early-termination node.

2. The method of claim 1, wherein the set of primitives comprises primitives of a specified type specified by the request and does not include primitives that are not of the specified type.

3. The method of claim 2, wherein the specified type comprises a primitive that blocks a light source.

4. The method of claim 1, wherein evaluating the ray against a non-leaf node comprises determining that the ray intersects a bounding box associated with the non-leaf node.

5. The method of claim 4, further comprising:

in response to determining that the ray intersects the bounding box associated with the non-leaf node, eliminating children of the non-leaf node from consideration.

6. The method of claim 1, wherein:

the at least one early-termination node comprises a convex mesh-interior geometry primitive.

7. The method of claim 6, wherein:

the convex mesh-interior geometry primitive comprises an axis-aligned bounding box.

8. A device for performing ray tracing operations, the device comprising:

a memory storing at least a portion of a bounding volume hierarchy; and a ray tracing pipeline, configured to:

receive a request to determine whether a ray intersects any primitive of a set of primitives;

evaluate the ray against non-leaf nodes of the bounding volume hierarchy to determine whether to eliminate portions of the bounding volume hierarchy from consideration;

determine that the ray intersects at least one early-termination node not eliminated from consideration, wherein the early-termination node has an associated geometry that is fully enclosed by a mesh, wherein the mesh includes a plurality of primitives represented in leaf nodes of the bounding volume hierarchy, wherein the ray intersects the geometry that is fully enclosed by the mesh; and determine that traversal of the bounding volume hierarchy should terminate, based on the result of the evaluation of the ray against the at least one early-termination node.

9. The device of claim 8, wherein the set of primitives comprises primitives of a specified type specified by the request and does not include primitives that are not of the specified type.

10. The device of claim 9, wherein the specified type comprises a primitive that blocks a light source.

11. The device of claim 8, wherein evaluating the ray against a non-leaf node comprises determining that the ray intersects a bounding box associated with the non-leaf node.

12. The device of claim 11, wherein the ray tracing pipeline is further configured to:

in response to determining that the ray intersects the bounding box associated with the non-leaf node, eliminate children of the non-leaf node from consideration.

13. The device of claim 8, wherein:

the at least one early-termination node comprises a convex mesh-interior geometry primitive.

14. The device of claim 13, wherein:

the convex mesh-interior geometry primitive comprises an axis-aligned bounding box.

15. A non-transitory computer-readable medium storing instructions that, when executed by a processor, cause the processor to perform ray tracing operations, by:

receiving a request to determine whether a ray intersects any primitive of a set of primitives;

evaluating the ray against non-leaf nodes of a bounding volume hierarchy to determine whether to eliminate portions of the bounding volume hierarchy from consideration;

determining that the ray intersects at least one early-termination node not eliminated from consideration, wherein the early-termination node has an associated geometry that is fully enclosed by a mesh, wherein the mesh includes a plurality of primitives represented in leaf nodes of the bounding volume hierarchy, wherein the ray intersects the geometry that is fully enclosed by the mesh; and determining that traversal of the bounding volume hierarchy should terminate, based on the result of the evaluation of the ray against the at least one early-termination node.

16. The non-transitory computer-readable medium of claim 15, wherein the set of primitives comprises primitives of a specified type specified by the request and does not include primitives that are not of the specified type.

17. The non-transitory computer-readable medium of claim 16, wherein the specified type comprises a primitive that blocks a light source.

18. The non-transitory computer-readable medium of claim 15, wherein the set of primitives comprises primitives of a specified type specified by the request and does not include primitives that are not of the specified type.

19. The non-transitory computer-readable medium of claim 15, wherein evaluating the ray against a non-leaf node comprises determining that the ray intersects a bounding box associated with the non-leaf node.

20. The non-transitory computer-readable medium of claim 19, wherein the instructions further cause the processor to:

in response to determining that the ray intersects the bounding box associated with the non-leaf node, eliminate children of the non-leaf node from consideration.

* * * * *